United States Patent
Park

(10) Patent No.: US 7,412,613 B2
(45) Date of Patent: Aug. 12, 2008

(54) INTEGRATED CIRCUIT DEVICES THAT SUPPORT DYNAMIC VOLTAGE SCALING OF POWER SUPPLY VOLTAGES

(75) Inventor: Gi-ho Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 337 days.

(21) Appl. No.: 11/060,838

(22) Filed: Feb. 18, 2005

(65) Prior Publication Data

US 2005/0188233 A1 Aug. 25, 2005

(30) Foreign Application Priority Data

Feb. 20, 2004 (KR) .................. 10-2004-0011324

(51) Int. Cl.
*G06F 1/32* (2006.01)
*G06F 1/00* (2006.01)

(52) U.S. Cl. ................. 713/320; 713/322

(58) Field of Classification Search ............ 713/20
See application file for complete search history.

(56) References Cited

U.S. PATENT DOCUMENTS

| 5,974,551 A | 10/1999 | Lee |
| 6,009,005 A | 12/1999 | Kim |
| 6,064,223 A | 5/2000 | Lu et al. |
| 6,426,908 B1 | 7/2002 | Hidaka |
| 6,509,788 B2 | 1/2003 | Naffziger et al. |
| 6,515,530 B1 | 2/2003 | Boerstler et al. |
| 6,586,963 B2 | 7/2003 | Choi et al. |
| 6,636,083 B1 | 10/2003 | Wong et al. |
| 6,690,752 B2 | 2/2004 | Beerel et al. |
| 6,735,707 B1 * | 5/2004 | Kapil ................... 713/322 |
| 6,775,784 B1 | 8/2004 | Park |
| 6,836,824 B1 * | 12/2004 | Mirov et al. ............ 711/118 |
| 7,143,381 B2 * | 11/2006 | Zhao et al. .............. 716/10 |
| 7,203,847 B2 | 4/2007 | Park |
| 7,248,522 B2 * | 7/2007 | Hardee ................. 365/205 |
| 2002/0065618 A1 * | 5/2002 | Oh ........................ 702/57 |
| 2002/0140467 A1 | 10/2002 | Naffziger et al. |
| 2003/0135768 A1 * | 7/2003 | Knee et al. ............ 713/300 |
| 2003/0168915 A1 | 9/2003 | Zhang et al. |
| 2004/0027173 A1 * | 2/2004 | Hoshi et al. ............. 327/91 |
| 2004/0117680 A1 | 6/2004 | Naffziger |
| 2004/0153679 A1 | 8/2004 | Fitton et al. |
| 2004/0190210 A1 * | 9/2004 | Leete ...................... 361/90 |
| 2005/0068799 A1 * | 3/2005 | Bedwell et al. ......... 365/63 |

FOREIGN PATENT DOCUMENTS

| JP | 5-266224 | 10/1993 |
| JP | 2002-288984 | 10/2002 |
| JP | 2001-326327 | 7/2003 |

\* cited by examiner

*Primary Examiner*—Rehana Perveen
*Assistant Examiner*—Mohammed H Rehman
(74) *Attorney, Agent, or Firm*—Myers Bigel Sibley & Sajovec PA

(57) ABSTRACT

An integrated circuit device is provided with a power supply voltage generator therein. This voltage generator is configured to respond to an operating mode control signal by generating first and second power supply voltages at equivalent voltage levels when the operating mode control signal designates a normal mode of operation within the integrated circuit device. The power supply voltage generator is also configured to reduce the first and second power supply voltages to unequal lower voltage levels when the operating mode control signal designates a power saving mode of operation within the integrated circuit device. The power supply voltage generator may also generate a third power supply voltage at a constant level during both the normal and power saving modes of operation.

6 Claims, 3 Drawing Sheets

INTEGRATED CIRCUIT DEVICES THAT SUPPORT DYNAMIC VOLTAGE SCALING OF POWER SUPPLY VOLTAGES

REFERENCE TO PRIORITY APPLICATION

This application claims priority to Korean Application Serial No. 2004-11324, filed Feb. 20, 2004, the disclosure of which is hereby incorporated herein by reference.

FIELD OF THE INVENTION

The present invention relates to integrated circuit devices and, more particularly, to integrated circuit devices that support normal and power saving modes of operation.

BACKGROUND OF THE INVENTION

Integrated circuit devices may utilize dynamic voltage scaling techniques to reduce power consumption therein during certain modes of operation. As illustrated by FIG. 1, a conventional integrated circuit device 100 (e.g., a flash memory device) may include an operating voltage generating unit 110 (e.g., a power supply voltage generator) and an operating unit 115. The operating unit 115 includes a plurality of operating sections/circuits that may perform distinct integrated circuit functions. These operation sections include first, second and third operating sections 120, 130 and 140, respectively. Each of these operating sections 120, 130 and 140 is powered by a power supply signal VREF, which may be reduced from one voltage level (e.g., 1.2 Volts) to a lower voltage level (e.g., 0.8 Volts) when a power saving mode of operation is entered during dynamic voltage scaling. Unfortunately, controlling all operating sections in an equivalent manner during dynamic voltage scaling may result in less than optimum performance in one or more of the operating sections. Accordingly, there exists a need for improved dynamic voltage scaling techniques for large scale integrated circuits having operating sections with different operating characteristics.

SUMMARY OF THE INVENTION

Embodiments of the present invention may include an integrated circuit device having a power supply voltage generator therein. This voltage generator is configured to respond to an operating mode control signal by generating first and second power supply voltages at equivalent voltage levels when the operating mode control signal designates a normal mode of operation within the integrated circuit device. The power supply voltage generator is also configured to reduce the first and second power supply voltages to unequal lower voltage levels when the operating mode control signal designates a power saving mode of operation within the integrated circuit device. These unequal lower voltage levels may support optimum power saving operations within each of a plurality of integrated circuits. The integrated circuit device also includes an operating mode selecting unit configured to generate the operating mode control signal at a first logic level during the normal mode of operation and a second logic level during the power saving mode of operation. The power supply voltage generator may also generate a third power supply voltage at a constant level during both the normal and power saving modes of operation.

The integrated circuit device also includes first, second and third operating integrated circuits powered by the first, second and third power supply voltages, respectively, during the normal and power saving modes of operation. The third operating integrated circuit is also responsive to the operating mode control signal. The third operating integrated circuit may include a cache memory and a line buffer, which are both responsive to an address. A cache memory enable circuit is also provided, which is coupled to the cache memory and responsive to the operating mode control signal. Similarly, a line buffer enable circuit is provided, which is coupled to the line buffer and responsive to the operating mode control signal. The line buffer is also configured to generate an output control signal, which is provided as a control input to the cache memory enable circuit. The line buffer is accessed during the power saving mode of operation to provide lower power memory access operations when compared to accessing the cache memory during the normal mode of operation.

DESCRIPTION OF PREFERRED EMBODIMENTS

Figure 1:
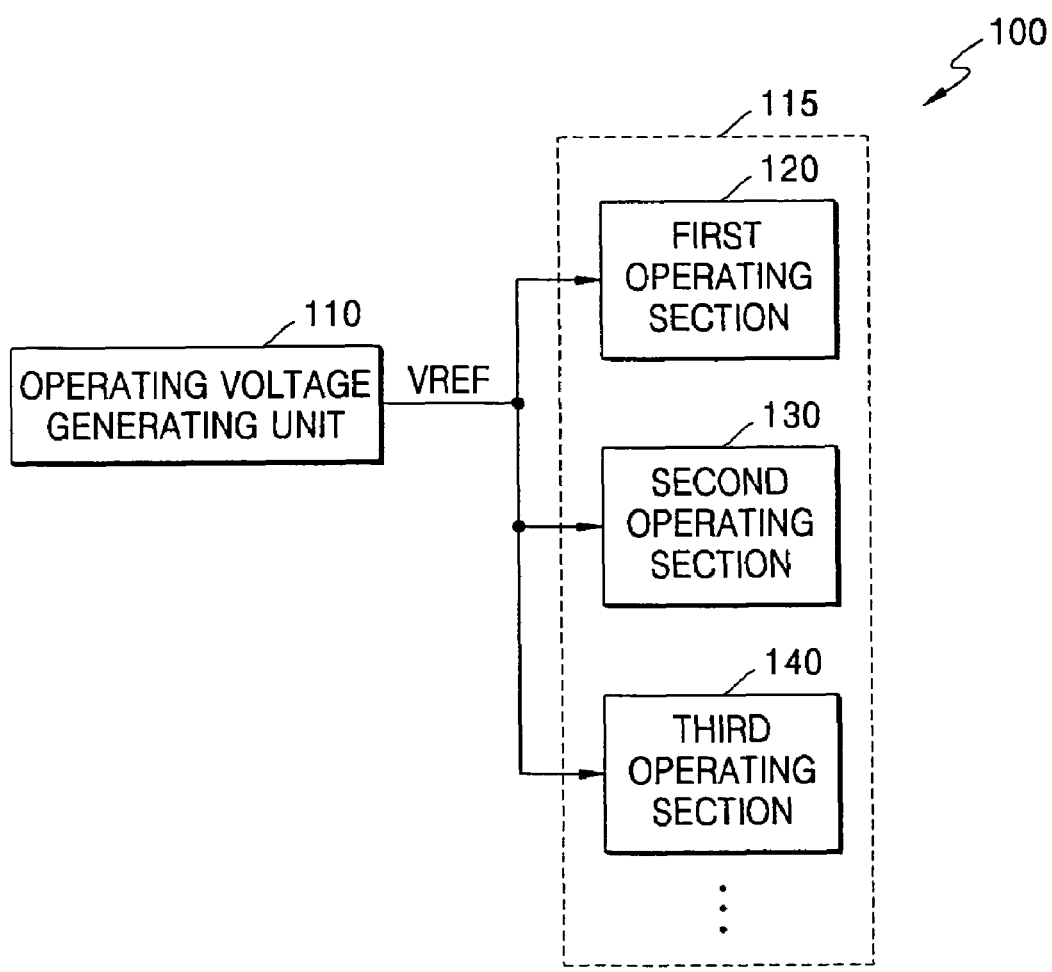
FIG. 1 is a block diagram of a conventional integrated circuit system that supports dynamic voltage scaling.

The present invention now will be described more fully herein with reference to the accompanying drawings, in which preferred embodiments of the invention are shown. This invention may, however, be embodied in many different forms and should not be construed as being limited to the embodiments set forth herein; rather, these embodiments are provided so that this disclosure will be thorough and complete, and will fully convey the scope of the invention to those skilled in the art. Like reference numerals refer to like elements throughout and signal lines and signals thereon may be referred to by the same reference characters. Signals may also be synchronized and/or undergo minor boolean operations (e.g., inversion) without being considered different signals.

Figure 2:
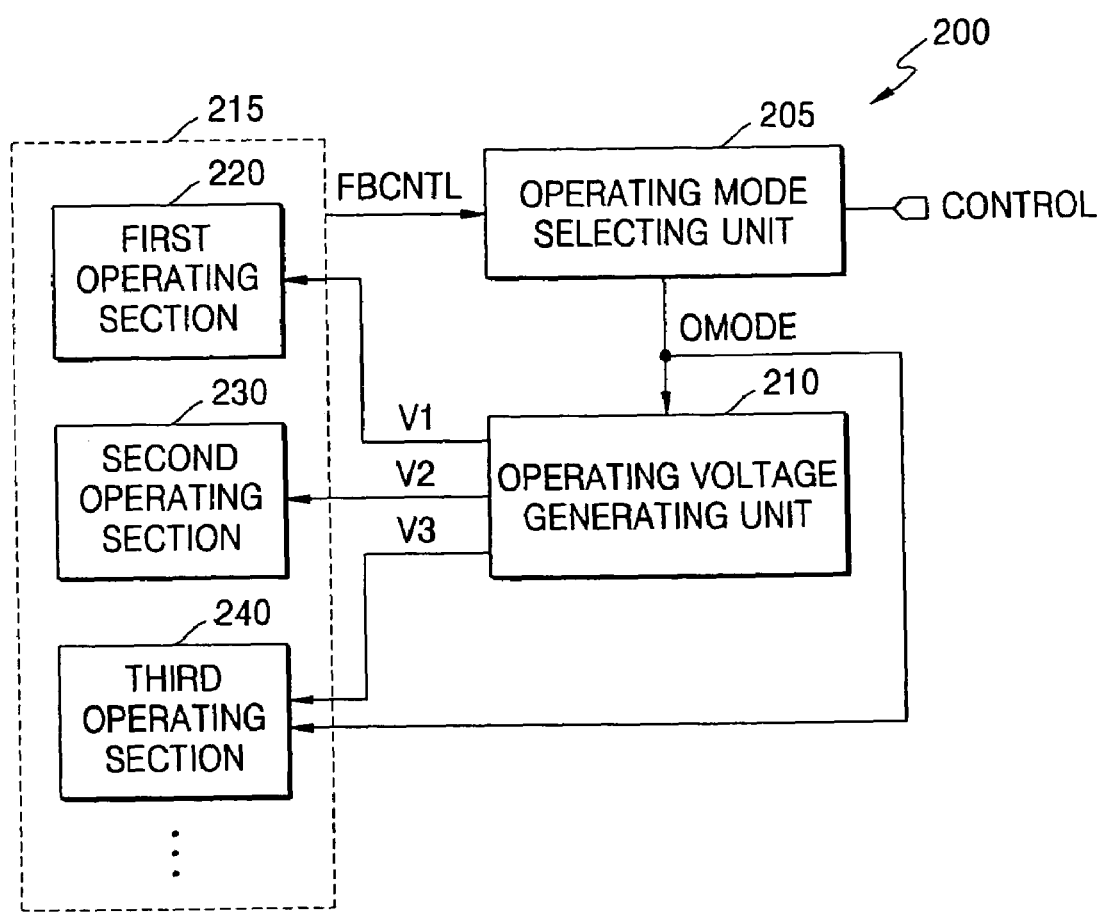
FIG. 2 is a block diagram of an integrated circuit system that supports dynamic voltage scaling according to embodiments of the present invention.

An integrated circuit system 200 that supports dynamic voltage scaling according to embodiments of the present invention is illustrated by FIG. 2. This system 200 includes an operating mode selecting unit 205, an operating voltage generating unit 210 (e.g., power supply voltage generator) and an operation unit 215. This operation unit 215 is illustrated as including a plurality of different operating sections. The operating sections may be separate integrated circuits within a common integrated circuit substrate (e.g., integrated circuit chip). In particular, the operation unit 215 may include at least two of three different operating sections, which are shown as a first operating section 220, a second operating section 230 and a third operating section 240. In alternative embodiments of the present invention, a greater or fewer number of operating sections may be provided within the operation unit 215.

The operating mode selecting unit 205 is configured to generate an operating mode signal (OMODE). This operating mode signal OMODE may be set to a first logic level (e.g., OMODE=1) to reflect a normal mode of operation and a second logic level (e.g., OMODE=0) to reflect a power saving mode of operation that supports dynamic voltage scaling as described more fully hereinbelow. In some embodiments of the present invention, the operating mode selecting unit 205 may be responsive to a control signal (CONTROL) that designates whether a power saving mode of operation is to be commenced. This control signal CONTROL may be generated by a command host or other device located internal to or external to an integrated circuit substrate containing the system 200. In other embodiments of the invention, the operating mode selecting unit 205 may be responsive to a feedback control signal (FBCNTL) generated by the operation unit 215. This feedback control signal FBCNTL may designate whether a power saving mode of operation is to be commenced in response to modified operating characteristics within the operation unit 215. In still other embodiments of the invention, the operating mode selecting unit 205 may be responsive to both the control signal CONTROL and the feedback control signal FBCNTL, as illustrated.

The operating mode signal OMODE is provided as a control signal to the operating voltage generating unit 210. When the operating mode signal OMODE is set to designate a normal mode of operation, the operating voltage generating unit 210 may generate a plurality of power supply voltages V1, V2 and V3 at equivalent voltage levels (e.g., 1.2 Volts). However, when the operating mode signal OMODE is set to designate a power saving mode of operation that supports dynamic voltage scaling, then the operating voltage generating unit 210 may generate a first power supply voltage V1 at a first voltage level (e.g., 0.8 Volts) and generate a second power supply voltage V2 at a second voltage level (e.g., 0.6 Volts), which is lower than the first voltage level. These different power supply voltage levels V1 and V2 may support optimum power saving characteristics within each of the first and second operating sections 220 and 230. In contrast, the third power supply voltage V3 generated by the operating voltage generating unit 210 may be held at a fixed voltage during both normal and power saving modes of operation (i.e., when OMODE equals 0 or 1). In this case, the third operating section 240 may contain critical circuit elements that are not to undergo a reduction in power supply voltage when other circuits in the operation unit 215 are entering power saving modes of operation at distinct lower power supply voltages (e.g., 0.8 and 0.6 Volts).

Although the third operating section 240 does not experience a reduction in power supply voltage when the operating mode signal OMODE is switched to designate a power saving mode of operation using dynamic voltage scaling, the third operating section 240 may nonetheless respond directly to the operating mode signal OMODE, which is provided as a control input to the third operating section 240. When this occurs, the third operating section 240 may take advantage of improved timing margins to achieve significant power savings for the system 200. For example, if the nominal operating frequency of the system 200 is maintained at 500 MHz during the normal mode of operation when V1=V2=V3=1.2 Volts and then reduced to 400 MHz during the power saving mode of operation when V1=0.8 Volts, V2=0.6 Volts and V3=1.2 Volts, the sustained higher operating frequency of the third operating section 240 (i.e., 500 MHz) may be used advantageously to reduce power therein. This reduction in power is achieved by taking advantage of additional timing margins within the third operating section 240. These additional timing margins are present because a 500 MHz signal (within the third operating section 240) has a period of 2 ns while a 400 MHz signal (within the first and second operating sections 220 and 230) has a period of 2.5 ns. Thus, an additional timing margin of about 0.5 ns may be present in the timing of circuits in the third operating section 240. An example of how a reduction in power may be achieved within an operating section that is supplied with a fixed higher power supply voltage (e.g., 1.2 Volts) will now be described with respect to FIG. 3.

Figure 3:
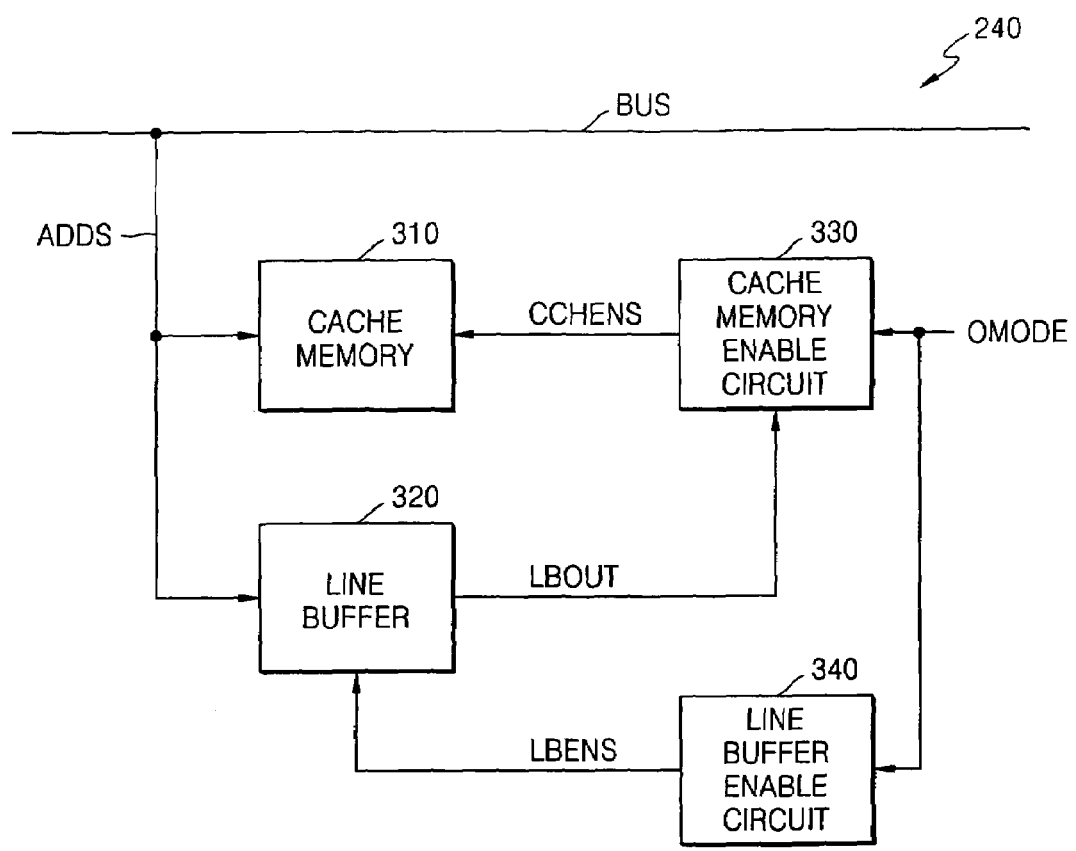
FIG. 3 is a block diagram of a third operating section illustrated by FIG. 2, according to embodiments of the present invention.

FIG. 3 illustrates a third operating section 240 that may be used within the operation unit 215 of FIG. 2. This third operating section 240 includes a memory circuit. This memory circuit includes a cache memory device 310 and a line buffer 320. Both the cache memory device 310 and the line buffer 320 are responsive to address signals ADDS provided from a bus (BUS), however, the line buffer 320 has characteristics that support lower power consumption when operated as a memory device instead of the cache memory device 310. The cache memory device 310 may be enabled/disabled in response to a cache enable signal CCHENS and the line buffer 320 may be enabled/disabled in response to a buffer enable signal LBENS. As illustrated, the cache enable signal CCHENS is generated by a cache memory enable circuit 330, which is responsive to the operating mode signal OMODE. Similarly, the buffer enable signal LBENS is generated by a line buffer enable circuit 340, which is also responsive to the operating mode signal OMODE.

The line buffer 320 is also configured to generate an output signal LBOUT, which is provided as a control input to the cache memory enable circuit 330. When the operating mode signal OMODE switches to a logic level that designates a power saving mode of operation using dynamic voltage scaling within the first and second operating sections 220 and 230, the cache memory enable circuit 330 is switched from an enabled condition to a disabled condition to thereby suspend operations within the cache memory 310 (via the cache enable signal CCHENS) and the line buffer enable circuit 340 is switched from a disabled condition to an enabled condition to thereby activate the line buffer 320 as a replacement memory for the cache memory 310. In contrast, during a normal mode of operation, the line buffer 320 is disabled and the cache memory 310 is enabled for all memory operations that occur while the operating mode signal OMODE designates normal mode operation.

When the line buffer 320 is activated, considerably lower power memory access operations (reading and writing) can be performed relative to the performance of these same operations within the cache memory 310 during the normal mode of operation (when all of the first, second and third operating sections/circuits 220, 230 and 240 are operating at an equivalent high frequency). Moreover, by exploiting the additional timing budget resulting from the larger timing margins associated with communications to and from the third operating section 240, which results from operating the third operating section 240 at a higher frequency relative to the first and second operating sections 220 and 230, any initial failure of the line buffer 320 to provide desired read data from a designated address ADDS will result in a secondary "backup" access to the cache memory 310 for the desired data. In particular, in the relatively infrequent event the line buffer 320 cannot provide the correct read data designated by an address ADDS, the output signal LBOUT will be switched to a level that triggers the cache memory enable circuit 330 to generate an active cache enable signal CCHENS. Upon generation of this active cache enable signal CCHENS, the cache memory 310 will undergo a secondary read operation at the designated address ADDS and the correct read data will be provided to an output bus. This initial access to the line buffer 320 followed by the relatively infrequent secondary access to the cache memory 310 will incur a greater time penalty relative to accessing only the cache memory 310 for all memory operations, but this greater time penalty can still fit within the additional timing margins provided within third operating section 240. Accordingly, based on the illustrated configuration of the third operating section 240, significant power savings can be achieved within the third operating section 240 even when the power supply voltage for the third operating section 240 is maintained at a normal mode level (e.g., 1.2

Volts) when the other first and second operating sections 220 and 230 are experiencing dynamic voltage scaling using lower power supply voltages.

The embodiments of the present invention may further be described as including an integrated circuit device 200 having a power supply voltage generator 210 therein. This voltage generator 210 is configured to respond to an operating mode control signal (OMODE) by generating first and second power supply voltages (V1 and V2) at equivalent voltage levels (e.g., 1.2 Volt) when the operating mode control signal OMODE designates a normal mode of operation within the integrated circuit device 200. The power supply voltage generator 210 is also configured to reduce the first and second power supply voltages to unequal lower voltage levels (e.g., 0.8 and 0.6 Volts) when the operating mode control signal OMODE designates a power saving mode of operation within the integrated circuit device 200. The integrated circuit device also includes an operating mode selecting unit 205 configured to generate the operating mode control signal OMODE at a first logic level (e.g., OMODE=1) during the normal mode of operation and a second logic level (e.g., OMODE=0) during the power saving mode of operation. The power supply voltage generator 210 may also generate a third power supply voltage V3 at a constant level during both the normal and power saving modes of operation.

The integrated circuit device 200 also includes first, second and third operating integrated circuits 220, 230 and 240 powered by the first, second and third power supply voltages V1, V2 and V3, respectively, during the normal and power saving modes of operation. The third operating integrated circuit 240 is also responsive to the operating mode control signal OMODE. As illustrated by FIG. 3, the third operating integrated circuit 240 includes a cache memory 310 and a line buffer 320, which are both responsive to an address ADDS. A cache memory enable circuit 330 is also provided, which is coupled to the cache memory 310 and responsive to the operating mode control signal OMODE. Similarly, a line buffer enable circuit 340 is provided, which is coupled to the line buffer 320 and responsive to the operating mode control signal OMODE. The line buffer is also configured to generate an output control signal LBOUT, which is provided as a control input to the cache memory enable circuit 330. During the power saving mode of operation, the line buffer 320 is accessed to provide lower power memory access operations relative to accessing the cache memory during the normal mode of operation.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. An integrated circuit device, comprising:
   a power supply voltage generator configured to respond to an operating mode control signal by generating first and second power supply voltages at equivalent voltage levels when the operating mode control signal designates a normal mode of operation within the integrated circuit device and reducing the first power supply voltage to a positive voltage less than the second power supply voltage, which remains constant, when the operating mode control signal designates a power saving mode of operation within the integrated circuit device;
   a first operating circuit powered by the first power supply voltage during the normal and power saving modes of operation; and
   a second operating circuit powered by the second power supply voltage during the normal and power saving modes of operation and responsive to the operating mode control signal, said second operating circuit configured to support a power saving mode of operation by replacing a first internal data path therein with a second internal data path when the operating mode control signal switches from designating the normal mode of operation to designating the power saving mode of operation; and
   wherein said second operating circuit is further configured to utilize an additional timing margin resulting from a higher frequency of operation of the second operating circuit relative to the first operating circuit during the power saving mode of operation, when performing a backup access to the first internal data path in response to detecting a read data failure associated with the second internal data path.

2. The integrated circuit device of claim 1, wherein said second operating circuit comprises a cache memory and a line buffer in the internal data path; and wherein said second operating circuit is configured to replace the cache memory with the line buffer when the operating mode control signal switches from designating the normal mode of operation to designating the power saving mode of operation.

3. The integrated circuit device of claim 1, wherein said second operating circuit operates at a higher frequency than said first operating circuit during the power saving mode of operation.

4. The integrated circuit device of claim 1, wherein said second operating circuit comprises at least one memory enable circuit responsive to the operating mode control signal.

5. The integrated circuit device of claim 1, wherein the third operating integrated circuit comprises:
   a cache memory responsive to an address;
   a line buffer responsive to the address;
   a cache memory enable circuit coupled to the cache memory and responsive to the operating mode control signal; and
   a line buffer enable circuit coupled to the line buffer and responsive to the operating mode control signal.

6. The integrated circuit device of claim 5, wherein the line buffer is configured to generate an output control signal; and wherein the cache memory enable circuit is responsive to the output control signal.

* * * * *